(12) United States Patent
Ganille et al.

(10) Patent No.: US 8,395,533 B2
(45) Date of Patent: Mar. 12, 2013

(54) METHOD OF PRESENTING ANTI-COLLISION INFORMATION IN A HEAD-UP DISPLAY FOR AIRCRAFT

(75) Inventors: Thierry Ganille, Merignac (FR); Regis Azarian, Merignac (FR); Eric Filliatre, Merignac (FR)

(73) Assignee: Thales, Neuilly sur Seine (FR)

( * ) Notice: Subject to any disclaimer, the term of this patent is extended or adjusted under 35 U.S.C. 154(b) by 611 days.

(21) Appl. No.: 12/678,107

(22) PCT Filed: Aug. 25, 2008

(86) PCT No.: PCT/EP2008/061087
§ 371 (c)(1),
(2), (4) Date: Mar. 12, 2010

(87) PCT Pub. No.: WO2009/033940
PCT Pub. Date: Mar. 19, 2009

(65) Prior Publication Data
US 2010/0309025 A1 Dec. 9, 2010

(30) Foreign Application Priority Data
Sep. 14, 2007 (FR) ..................................... 07 06465

(51) Int. Cl.
*G08B 23/00* (2006.01)

(52) U.S. Cl. .......................... 340/963; 340/970; 340/945

(58) Field of Classification Search .................. 340/963, 340/945, 970; 701/301, 1, 10
See application file for complete search history.

(56) References Cited

U.S. PATENT DOCUMENTS

| 5,248,968 A | * | 9/1993 | Kelly et al. ................... 340/961 |
| 6,057,786 A | * | 5/2000 | Briffe et al. ................... 340/975 |
| 6,690,299 B1 | | 2/2004 | Suiter |

(Continued)

FOREIGN PATENT DOCUMENTS

| FR | 2 897 839 A1 | 8/2007 |
| WO | 2008/065119 A1 | 6/2008 |

(Continued)

OTHER PUBLICATIONS

Michael C. Dorneich, et al., "Design and Evaluation of an Integrated Avionics Alerting System", 20th Digital Avionics Systems Conference, Oct. 14-18, 2001, pp. 5.D.1-1-5.D.1-12, vol. 1, IEEE, Piscataway, NJ, USA.

*Primary Examiner* — Jennifer Mehmood
*Assistant Examiner* — Rufus Point
(74) *Attorney, Agent, or Firm* — Baker Hostetler LLP

(57) ABSTRACT

The invention relates to a method for managing an anti-collision system for aircraft, said system comprising means of detecting collision with a threat and at least one head-up viewing device. The symbol system comprises two display modes dedicated to collision detection which are: on the one hand an "action" mode: a potential collision is detected by the system, the symbol system comprises at least one symbol representative of the limits of the disengagement path of the aircraft to avoid the collision and enabling the pilot to engage his avoidance maneuver, and on the other hand a "control" mode: this mode is displayed when the avoidance maneuver is engaged and the collision avoided, the symbol system comprises at least the symbol representative of the limits of the disengagement path of the aircraft and a plan view representing the air space around the aircraft and including at least one representation of the threat.

7 Claims, 5 Drawing Sheets

U.S. PATENT DOCUMENTS

| | | | |
|---|---|---|---|
| 7,412,308 B2* | 8/2008 | Naimer et al. | 701/7 |
| 7,564,372 B1* | 7/2009 | Bailey et al. | 340/961 |
| 7,825,831 B2* | 11/2010 | Naimer et al. | 340/975 |
| 8,049,644 B1* | 11/2011 | Oehlert et al. | 340/970 |
| 8,184,020 B2* | 5/2012 | He | 340/976 |
| 8,310,378 B2* | 11/2012 | Suddreth | 340/971 |
| 2002/0039070 A1 | 4/2002 | Ververs et al. | |
| 2002/0149599 A1 | 10/2002 | Dwyer et al. | |
| 2004/0239529 A1* | 12/2004 | Tran | 340/961 |
| 2005/0075762 A1* | 4/2005 | Naimer et al. | 701/7 |
| 2007/0182589 A1* | 8/2007 | Tran | 340/961 |
| 2008/0252636 A1 | 10/2008 | Servantie et al. | |
| 2009/0024260 A1 | 1/2009 | Deleris et al. | |
| 2009/0303082 A1* | 12/2009 | Larson et al. | 340/945 |
| 2010/0309025 A1* | 12/2010 | Ganille et al. | 340/963 |

FOREIGN PATENT DOCUMENTS

WO  2008/065120 A1  6/2008

* cited by examiner

METHOD OF PRESENTING ANTI-COLLISION INFORMATION IN A HEAD-UP DISPLAY FOR AIRCRAFT

CROSS-REFERENCE TO RELATED APPLICATIONS

This application is a National Stage of International patent application PCT/EP2008/061087, filed on Aug. 25, 2008, which claims priority to foreign French patent application No. FR 07 06465, filed on Sept. 14, 2007, the disclosures of which are hereby incorporated by reference in their entirety.

FIELD OF THE INVENTION

The field of the invention is that of flight management systems for aircraft comprising an anti-collision system and a collimated viewing device making it possible to present symbol systems dedicated to the avoidance of obstacles.

BACKGROUND OF THE INVENTION

In flight, there are two types of potential collision. The aircraft may either strike the ground or another craft forming part of the air traffic. The aeronautical industry is focusing its efforts on means of reducing and ultimately eliminating all future accidents associated with such collisions.

Regarding collisions with the terrain, the technological progress made notably in the development of digitized terrain files, in positioning accuracy thanks to "GPS" (Global Positioning System) locating and in the increase in processing power has made it possible to develop novel concepts making it possible to safeguard against these risks of collision with the ground in controlled flight, better known by the acronym CFIT which stands for "Controlled Flight Into Terrain".

These concepts are based essentially on an extrapolation of the current trajectory of the aircraft and on a terrain database corresponding to the relief being flown over making it possible to predict these risks. In general, there are two types of terrain that present a risk of collision with the aircraft. The first type represents the areas of terrain representing an imminent danger to the craft. These are called "TAA", which stands for "Terrain Alert Area". The second type represents the areas of terrain representing a more distant danger to the craft. These are called "THD", which stands for "Terrain Hazard Display". These concepts are embodied in the form of a new generation of equipment intended for transport or business airplanes called "TAWS" standing for "Terrain Awareness and Warning System" or "GCAS" standing for "Ground Collision Avoidance System". The "GCAS" system essentially comprises a central electronic computer linked on the one hand to the network of probes and feelers of the aircraft and on the other hand to the different displays on the instrument panel, as well as to the audible alarms arranged in the cockpit, by means of a data transmission bus. The probes are essentially sensors making it possible to determine the position of the craft relative to the ground, its altitude and its speed.

The displays concerned are the head-up viewing device and the piloting and navigation head-down screens such as the "Navigation Display" and "Primary Flight Displays", screens denoted "HUD", "ND" and "PFD".

In the same way, current civilian aircraft are provided with traffic alert and collision avoidance systems, better known by their acronym "T-CAS", which stands for "Traffic Alert and Collision Avoidance System". This system is intended to significantly reduce the number of collisions between aircraft. It is mandatory on all craft exceeding a certain weight or transporting a certain number of passengers.

The "T-CAS" systems comprise at least one transponder, means of processing received data and at least one viewing means. An aircraft transponder is an onboard system which transmits a message concerning the aircraft when it receives an interrogation message. The message generally comprises a code identifying the craft and more or less detailed information on the position of the craft. In airplanes provided with viewing screens, the "TCAS" function is incorporated in the screen dedicated to navigation which is also called "Navigation Display" or ND. Generally, the "TCAS" system distinguishes two regions: a first region within which another aircraft may represent a risk of collision. If an aircraft appears in this region and represents a potential collision hazard, a traffic notification is emitted by the device called "Traffic Advisory" or "TA". The latter informs the pilot that another airplane is located nearby but does not suggest any avoidance maneuver. The second region is situated in the immediate environment of the aircraft. In this case, if an airplane appears in this region, the situation is aggravated and the collision seems imminent, an audio message and a visual alert are produced by the device called "Resolution Advisory" or "RA", indicating the airplane concerned and signaling the action to be performed by the pilot, namely either to maintain the current trajectory, or to climb, or to descend or even to monitor the vertical speed. The system is designed so that the "TCAS" of the other airplane recommends another maneuver. Very often, the "TCAS" tells the first airplane to climb and the second airplane to descend, which considerably increases the separation between the two craft. When the alert is ended, the system announces the end of the conflict.

In current civilian airplanes, a "GCAS" or "TCAS" alert triggers the following items:
  a voice maneuver instruction message which may be, for example, "PULL-UP" which means "CLIMB" in the case of a "GCAS" alarm or even "CLIMB-CLIMB" which means "CLIMB STEEPLY" in the case of a "TCAS" alarm;
  a display of the instruction on the "PFD" screen, for example a "PULL-UP" message in the case of a "GCAS" alarm or one or two red areas to be avoided and a green area in which to place the needle corresponding to the vertical speed of the craft in case of a "TCAS" alarm;
  a display of data of "situation awareness" type is superimposed on the situation permanently present on the screen of the "ND".
    In case of a "GCAS" alarm, this is the terrain area "TAA" calculated by the "TAWS" which is superimposed on the "THD" area already present and possibly on a map background concerning the most recent airplanes. This so-called 2.5D map background represents the terrain being flown over, the relief being represented in the form of shading.
    In case of a "TCAS" alarm, this is the display of the threatening airplane in amber or in red depending on whether the alert level is of the "TA" or "RA" type.

When the aircraft has a head-up viewing device, the latter conventionally displays information concerning piloting or navigation. In a head-up viewing device, such information is collimated to infinity and projected by superimposition on the external landscape. An example of this type of representation is given in FIG. 1. The pilot therefore simultaneously sees a projected symbol system and the "real world" situated outside the craft. In this figure and the subsequent figures, the external rectangle represents the limits of the display field of the viewing device. There is conventionally, on the right of FIG. 2, an altitude scale 1 in feet, on the left a speed scale 2 in knots, in the center, the horizon 3, the flight director 4 and at the bottom of FIG. 2, the heading indicator 5 with the indication of the path to be followed, better known by the acronym "HSI" which stands for "Horizontal Situation Indicator". As can be seen, this figure includes a large number of symbols that vary constantly according to the position of the craft. In nominal mode, this symbol system is perfectly suited to piloting and navigation. However, if a risk of collision occurs, in case of a "TCAS" alert only, currently, when a "HUD" is present, a guidance instruction is simply presented in the head-up display to avoid overloading the symbol system.

The drawback of the existing system is that a pilot using the guidance symbol system in head-up mode to modify the trajectory of the airplane cannot at the same time monitor the trend of the situation with regard to the threat originating the "TCAS" or "GCAS" alarm.

SUMMARY OF THE INVENTION

The aim of the method for managing an anti-collision system for aircraft according to the invention is to enable the pilot to monitor, in case of "GCAS" or "TCAS" alarm, the position of the carrier relative to the threat while at the same time following a guidance symbol system in head-up mode. For this, the presentation of the guidance information in head-up mode for the "GCAS" or "TCAS" alarms is enriched with danger information, better known by the name "situation awareness".

More specifically, the subject of the invention is a method for managing an anti-collision system for aircraft, said system comprising means of detecting collision with a threat and at least one head-up viewing device, said device comprising means of generating, collimating and superimposing symbols on the external landscape intended to assist in the piloting of said first aircraft in the horizontal and vertical planes, characterized in that the symbol system comprises two display modes dedicated to collision detection which are:
  action mode: a potential collision is detected by the system, the symbol system comprises at least one symbol representative of the limits of the disengagement path of the aircraft to avoid the collision and enabling the pilot to engage his avoidance maneuver;
  control mode: this mode is displayed when the avoidance maneuver is engaged and the collision avoided, the symbol system comprises at least the symbol representative of the limits of the disengagement path of the aircraft and a plan view representing the air space around the aircraft and including at least one representation of the threat.

Advantageously, the system is of the anti-collision with the terrain type, the threat being the terrain situated around the aircraft, that the symbol representative of the limits of the disengagement path includes a horizontal bar representative of the minimum gradient necessary for the aircraft to succeed in its avoidance maneuver.

In this case, the symbol representative of the limits of the disengagement path comprises two identical vertical parallel bars with an angular dimension substantially equal to the vertical angular field of the head-up viewing device, the positions of said bars in the horizontal plane being representative of the limits of the disengagement path of the aircraft, the horizontal bar being limited by these two vertical bars so as to form a large H in the field of the head-up viewing device. Furthermore, in control mode, the plan view represents the portion of terrain representing a threat, the portion of terrain is then represented by two areas, a first imminent danger area represented by a first luminance level, a second medium-term danger area represented by a second luminance level substantially less than the first luminance level. These two areas correspond to the bright read and bright yellow areas of the TAA displayed on the ND.

Advantageously, the system is of the air traffic anti-collision system type, the threat being a second aircraft, that the symbol representative of the limits of the disengagement path comprises a rectangle representative of the area in which the aircraft must engage to succeed in its avoidance maneuver. Furthermore, the rectangle is extended by two oblique bars attached either to the two top points of the rectangle, or to the two bottom points of the rectangle. The plan view then comprises a circle graduated with a known scale, centered on the first aircraft and a representation within said circle of the relative position of the second aircraft, said representation of the second aircraft possibly being a substantially square-shaped geometrical figure, and includes an indication of the relative altitude of the second aircraft in relation to the first aircraft and a trend arrow indicating whether the second aircraft is climbing or descending.

Advantageously, in the "action" or "control" modes, the symbol system does not include any heading indicator, also called "HSI".

BRIEF DESCRIPTION OF THE DRAWINGS

The invention will be better understood and other benefits will become apparent from reading the following description which is given by way of nonlimiting example, and from the appended figures in which.

DETAILED DESCRIPTION

The method for managing an anti-collision system for aircraft according to the invention adds to the existing symbol system of a head-up display "HUD", data of the "situation awareness" type represented by a plan view of an area of terrain in the case of a "GCAS" alarm or of threatening traffic in the case of a "TCAS" alarm. The presentation of such data corresponds to the "action-control" scheme that a pilot implements in the event of an alert necessitating a change of trajectory. An "action-control" scheme comprises two phases. A first so-called "action" phase in which the pilot must rapidly execute a maneuver. A second so-called "control" phase in which the pilot checks that the maneuver carried out has indeed taken his craft out of danger.

When an alert of "GCAS" or "TCAS" type occurs, in a first so-called "action" stage, a guidance symbol system is presented enabling the pilot to engage without delay the maneuver recommended by the system. Then, in a second so-called "control" stage, the maneuver being engaged, a "situation awareness" type symbol system is presented. The benefit of this time sequence is that the "situation awareness" type data is displayed only once the maneuver is engaged and the airplane out of danger making it possible for the distance of the threat to be monitored while allowing the pilot to focus on the guidance symbol system when the alarm is triggered.

Figure 2:
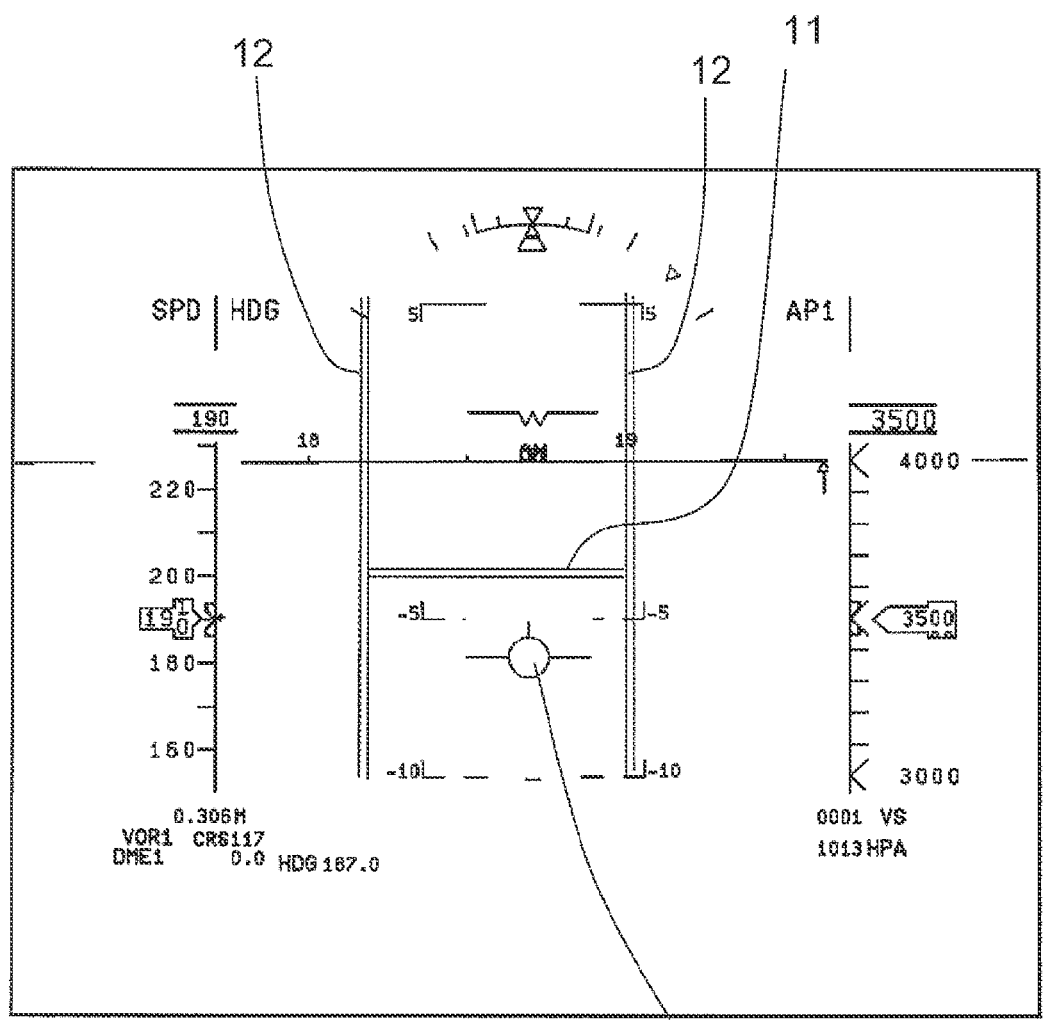
FIGS. 2 and 3 represent the trend of the symbol system according to the invention according to the imminence of the danger in the case of a "GCAS" system.
Figure 3:
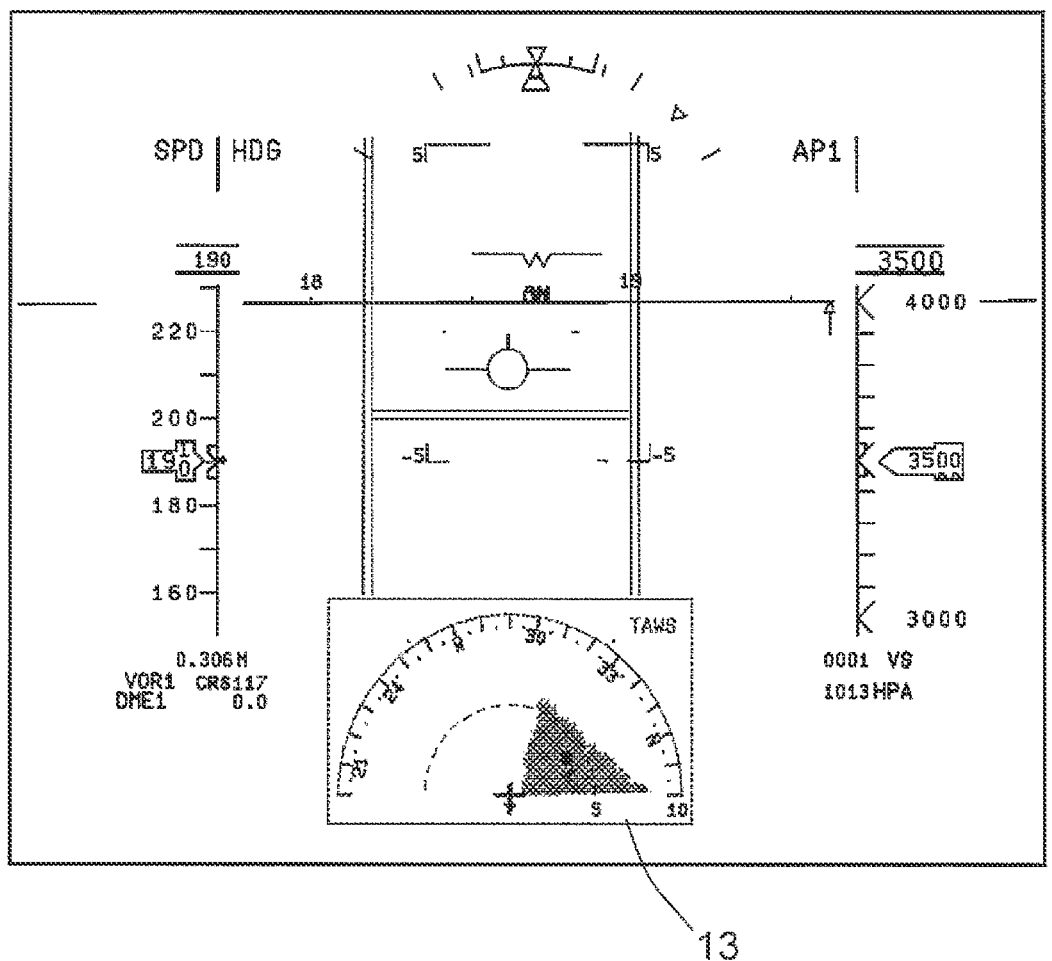

By way of nonlimiting examples, FIGS. 2 and 3 show the trend of the symbol system according to the invention according to the imminence of the danger in the case of a "GCAS" system. During the "action" and "control" phases, the heading indicator, called "HSI", is eliminated to lighten the symbol system and enable the pilot to concentrate on his maneuver.

FIG. 2 represents the symbol system in "action" mode in case of a GCAS alert. The symbol system presents to the pilot an area in which he must place the speed vector of the airplane to engage the avoidance maneuver. This area is called "fly-to-zone". In the present case, the symbol representative of the limits of the disengagement path comprises a horizontal bar 11 representative of the minimum gradient necessary for the aircraft to succeed in its avoidance maneuver and two identical vertical parallel bars 12 with an angular dimension substantially equal to the vertical angular field of the head-up viewing device, the positions of said bars in the horizontal plane being representative of the limits of the disengagement path of the aircraft, the horizontal bar being limited by these two vertical bars so as to form a large H in the field of the head-up viewing device, or else in the form of "rugby goal posts".

FIG. 3 represents the symbol system in "control" mode in case of a "GCAS" alert. In addition to the preceding symbol system, the head-up viewing device shows the area of terrain 13 responsible for the tripping of the alarm represented in plan view, namely the "TAA" data derived from the "TAWS". To simplify the display, the so-called "THD" data is not displayed. This symbol system is triggered once the speed vector has moved into the "fly-to-zone". This symbol system that is presented is monochrome, the color of the symbol system being green. The head-up viewing devices are monochrome for a number of reasons. On the one hand, the symbol system superimposed on the external landscape is simplified. This is so as to avoid disturbing the vision of the external landscape. Then, the green color corresponds to the maximum retinal sensitivity. Finally, it is difficult to make a polychrome viewing device without excessively attenuating the transmission of the external landscape. For the "TAA" or "TAWS" data, a good solution is to represent in light green, that is to say with a maximum luminosity, the area traditionally represented bright red on the screen of the "ND" and in dark green, that is to say with a luminosity equal to 50% of the maximum luminosity of the area usually represented in bright yellow on the screen of the "ND". This area is represented in gray in FIG. 3.

Figure 1:
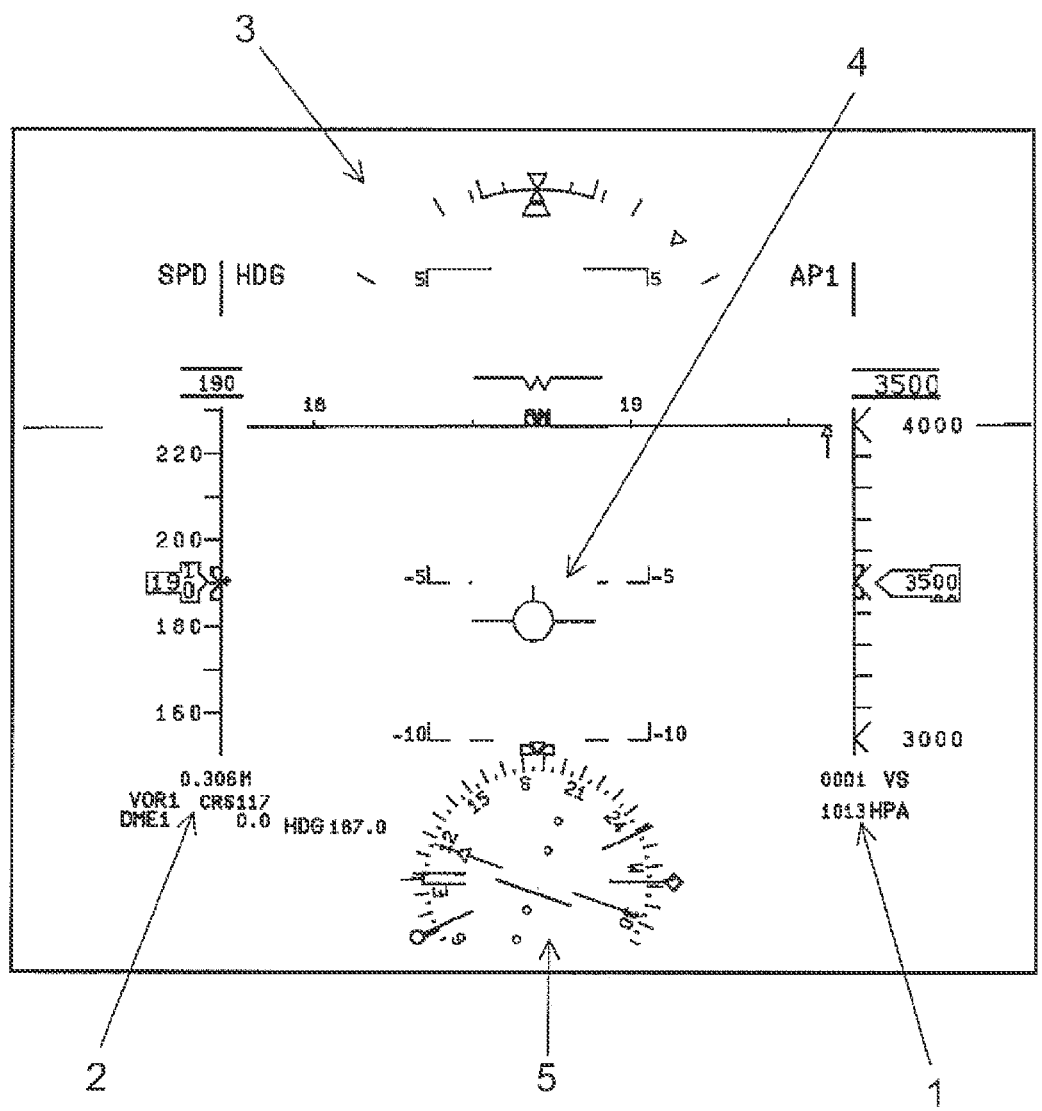
FIG. 1 represents a symbol system according to the prior art represented in a collimated viewing device.

Obviously, once the danger of collision has come to an end, the representation of the "TAA" data and of the "rugby goal posts" is eliminated and the usual presentation of the "HSI" is restored, as represented in FIG. 1.

Figure 4:
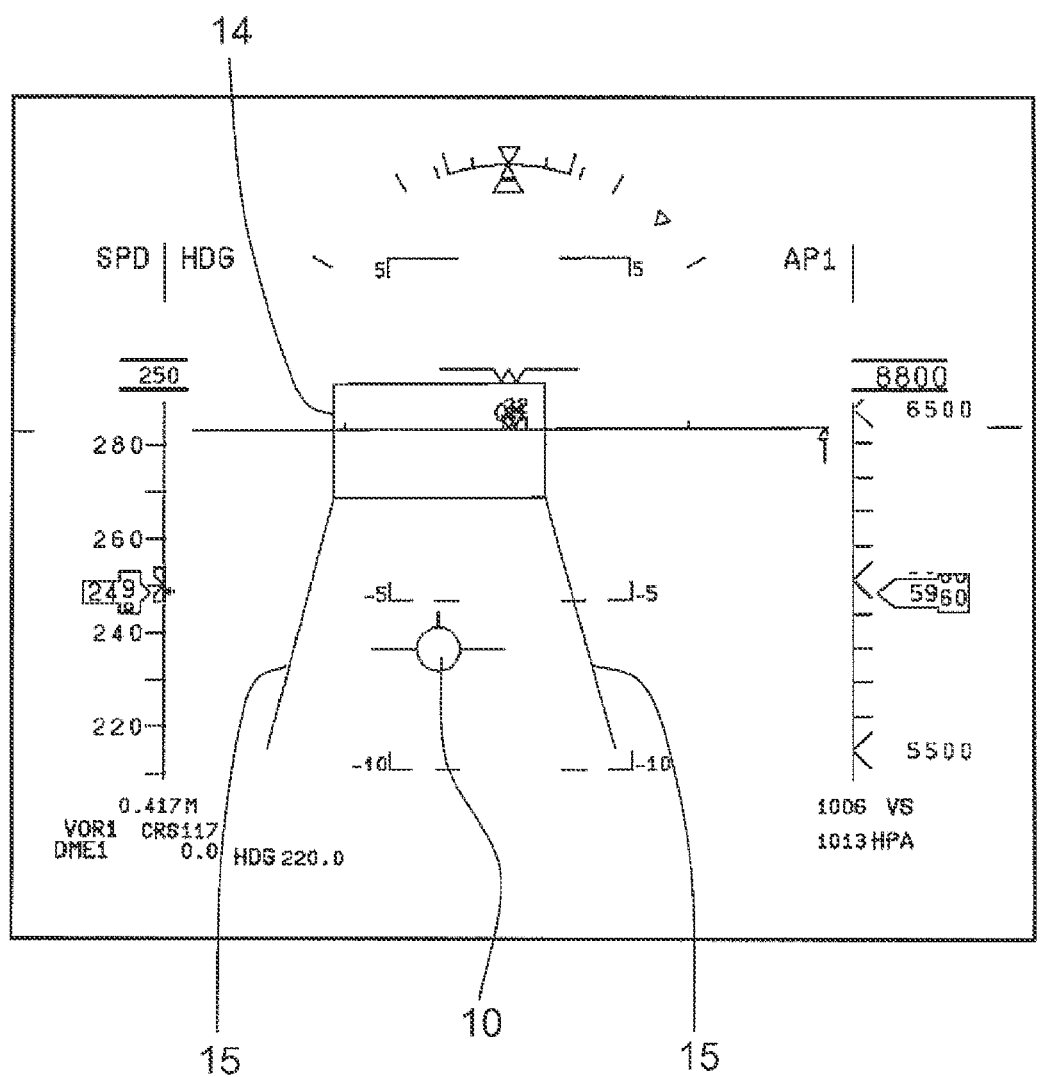
FIGS. 4 and 5 represent the trend of the symbol system according to the invention according to the imminence of the danger in the case of a "TCAS" system.
Figure 5:
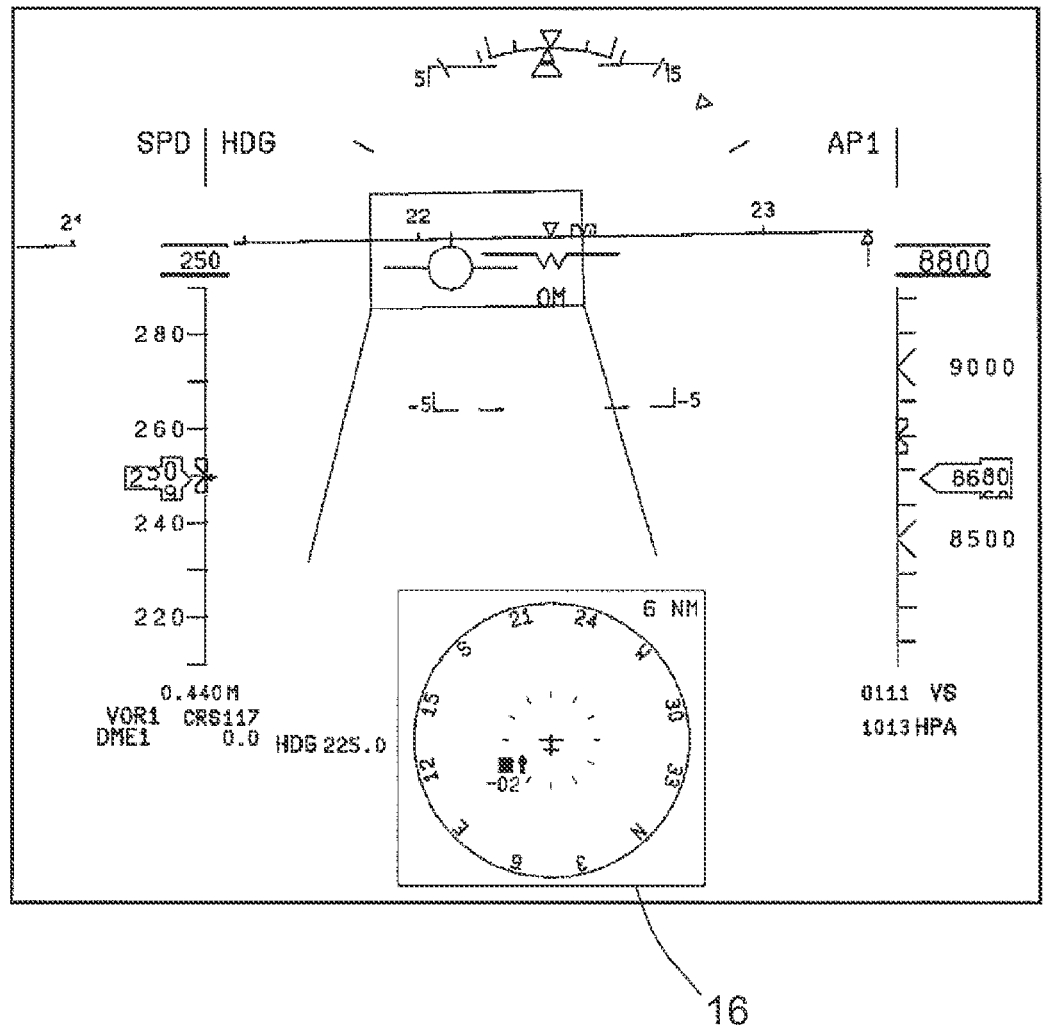

By way of second nonlimiting examples, FIGS. 4 and 5 represent the trend of the symbol system according to the invention according to the imminence of the danger in the case of a "TCAS" system. During the "action" and "control" phases, the head indicator, called "HSI", is also eliminated.

FIG. 4 represents the symbol system in "action" mode in case of a "TCAS" alert. The symbol system presents to the pilot an area in which he must place the speed vector of the airplane to engage the avoidance maneuver. This area is called "fly-to-zone". In the present case, the limits of the disengagement path comprise a rectangle 14 representative of the area in which the aircraft must engage to succeed in its avoidance maneuver. This rectangle is extended by two oblique bars 15 attached either to the two bottom points of the rectangle indicating the bottom limits of the disengagement path. It is also possible to represent the top limits of the disengagement path by two oblique bars attached to the two top points of the rectangle.

FIG. 5 represents the symbol system in "control" mode in case of a "TCAS" alert. This symbol system is engaged once the speed vector has moved into the "fly-to-zone". The head-up viewing device shows, in addition to the preceding symbol system, a plan view 16 which includes a circle graduated with a known scale, centered on the first aircraft and a representation inside the circle of the relative position of the second aircraft responsible for the tripping of the alarm, namely the so-called "RA" or "TA" data, without displaying the rest of the surrounding traffic. For an aircraft receiving an "RA" notification from the "TCAS" system, the square shape of the symbol is retained, as is its trend arrow and its relative altitude expressed in thousands of feet, but said symbol is displayed in green instead of the usual red on the "ND" type screens. In the interests of simplicity and ergonomy, it is preferable for the scale of the situation presented in the HUD to be fixed.

If the threat is also supplied by an "ADSB" ("Automatic Dependent Surveillance-Broadcast") system, the square is replaced by a chevron which also gives the heading of the threat.

Obviously, once the danger of collision is at an end, the representation of the "RA" or "TA" data, and of the rectangle representative of the "fly-to-zone", is eliminated, and the usual presentation of the "HSI" is restored, as represented in FIG. 1.

The invention claimed is:

1. An anti-collision system for aircraft, said system comprising means of detecting collision with a threat and at least one head-up viewing device, said device comprising means of generating, collimating and superimposing the symbols on the external landscape intended to assist in the piloting of said first aircraft in the horizontal and vertical planes, said symbols being a scale of altitude, a scale of speed, the horizon and the flight director, wherein, when the threat is the terrain situated under the aircraft, the symbol system comprises two display modes dedicated to collision detection which are:
   an action mode: wherein a potential collision is detected by the system, and the symbol system also comprises a symbol representative of the limits of the disengagement path of the aircraft to avoid the collision and enabling the pilot to engage his avoidance maneuver;
   a control mode: wherein this mode is displayed when the avoidance maneuver is engaged and the collision avoided, and the symbol system comprises the symbol representative of the limits of the disengagement path of the aircraft and, in addition, a plan view representing the air space around the aircraft and including at least one representation of the threat,
the symbol representative of the limits of the disengagement path comprising a horizontal bar representative of the minimum gradient necessary for the aircraft to succeed in its avoidance maneuver.

2. The anti-collision system as claimed in claim 1, wherein the symbol representative of the limits of the disengagement path includes two identical parallel vertical bars with an angular dimension substantially equal to the vertical angular field of the head-up viewing device, the positions of said bars in the horizontal plane being representative of the limits of the disengagement path of the aircraft, the horizontal bar being limited by these two vertical bars so as to form a large H in the field of the head-up viewing device.

3. The anti-collision system as claimed in claim 1, wherein, in control mode, the plan view represents the portion of terrain representing an obstacle.

4. The anti-collision system as claimed in claim 3, wherein the portion of terrain is represented by two areas, a first imminent danger area represented by a first luminance level, a second medium-term danger area represented by a second luminance level substantially less than the first luminance level.

5. An anti-collision system for aircraft, said system comprising means of detecting collision with a threat and at least one head-up viewing device, said device comprising means of generating, collimating and superimposing the symbols on the external landscape intended to assist in the piloting of said first aircraft in the horizontal and vertical planes, said symbols being a scale of altitude, a scale of speed, the horizon and the flight director, wherein, when the threat is a second aircraft, the symbol system comprises two display modes dedicated to collision detection which are:
- an action mode: wherein a potential collision is detected by the system, and the symbol system also comprises a symbol representative of the limits of the disengagement path of the aircraft to avoid the collision and enabling the pilot to engage his avoidance maneuver;
- a control mode: wherein this mode is displayed when the avoidance maneuver is engaged and the collision avoided, and the symbol system comprises the symbol representative of the limits of the disengagement path of the aircraft and, in addition, a plan view representing the air space around the aircraft and including at least one representation of the threat, the symbol representative of the limits of the disengagement path comprising a rectangle representative of the area in which the aircraft must engage to succeed in its avoidance maneuver, the rectangle being extended by two oblique bars attached either to the two top points of the rectangle, or to the two bottom points of the rectangle.

6. The anti-collision system as claimed in claim 5, wherein the plan view includes a circle graduated with a known scale, centered on the first aircraft and a representation within said circle of the relative position of the second aircraft.

7. The anti-collision system as claimed in claim 6, wherein the representation of the second aircraft is a substantially square-shaped geometrical figure and includes an indication of the relative altitude of the second aircraft in relation to the first aircraft and a trend arrow indicating whether the second aircraft is climbing or descending.

* * * * *